United States Patent
Chen et al.

(10) Patent No.: US 9,106,901 B2
(45) Date of Patent: Aug. 11, 2015

(54) IMAGERY AXLE TURNING METHOD FOR STEREO VISION AND APPARATUS THEREOF

(75) Inventors: Shing-Chia Chen, Taichung (TW); Min-Che Li, Taichung (TW); Huang-Long Lin, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 950 days.

(21) Appl. No.: 13/219,067

(22) Filed: Aug. 26, 2011

(65) Prior Publication Data

US 2012/0212584 A1   Aug. 23, 2012

(30) Foreign Application Priority Data

Feb. 23, 2011   (TW) .............................. 100106099 A

(51) Int. Cl.
*H04N 13/02* (2006.01)
*G03B 35/08* (2006.01)
*G06T 19/20* (2011.01)

(52) U.S. Cl.
CPC ............ *H04N 13/0239* (2013.01); *G03B 35/08* (2013.01); *H04N 13/0296* (2013.01); *G03B 2205/00* (2013.01); *G06T 19/20* (2013.01); *G06T 2219/2016* (2013.01)

(58) Field of Classification Search
CPC combination set(s) only.
See application file for complete search history.

(56) References Cited

U.S. PATENT DOCUMENTS

| | | | |
|---|---|---|---|
| 2,673,490 A * | 3/1954 | Poivilliers | 359/470 |
| 5,949,477 A * | 9/1999 | Hoglin | 348/47 |
| 6,392,688 B1 | 5/2002 | Barman et al. | |
| 6,512,892 B1 | 1/2003 | Montgomery et al. | |
| 6,674,462 B1 * | 1/2004 | Ooshima et al. | 348/42 |
| 7,933,512 B2 * | 4/2011 | Campbell et al. | 396/325 |
| 2003/0103651 A1 * | 6/2003 | Novak | 382/106 |
| 2003/0112327 A1 * | 6/2003 | Jeong et al. | 348/47 |
| 2004/0027657 A1 | 2/2004 | Steiner | |
| 2004/0061936 A1 * | 4/2004 | Morita | 359/462 |
| 2004/0095643 A1 | 5/2004 | Hirunuma et al. | |
| 2005/0053274 A1 * | 3/2005 | Mayer et al. | 382/154 |
| 2008/0117316 A1 * | 5/2008 | Orimoto | 348/240.3 |
| 2008/0185526 A1 * | 8/2008 | Horak et al. | 250/353 |
| 2008/0239135 A1 * | 10/2008 | Tamura | 348/335 |
| 2011/0069281 A1 * | 3/2011 | Redmann | 353/7 |
| 2011/0193944 A1 * | 8/2011 | Lian et al. | 348/47 |
| 2013/0222556 A1 * | 8/2013 | Shimada | 348/50 |
| 2013/0258129 A1 * | 10/2013 | Burns | 348/222.1 |

OTHER PUBLICATIONS

Certified translation of Office Action of corresponding CN application published on Mar. 27, 2014.

* cited by examiner

*Primary Examiner* — Dave Czekaj
*Assistant Examiner* — Tyler W Sullivan
(74) *Attorney, Agent, or Firm* — Wang Law Firm, Inc.; Li K. Wang; Stephen Hsu

(57) ABSTRACT

An imagery axle turning method for stereo vision and an apparatus thereof. The method turns an imagery axle of a stereo vision apparatus to capture images, and constructs a 3D image from the captured 2D images. The imagery axle turning method is realized by rotating the imagery axles of the first lens unit and second lens unit to an angle θ, so as to have different aspect ratios for the first image and second image. Thereby, the 3D image formed from the stereo vision reconstruction steps can achieve a user's expectation of capturing images with an appropriate aspect ratio. This invention also provides specific stereo vision apparatus corresponding to various applications by the imagery axle turning method.

3 Claims, 15 Drawing Sheets

IMAGERY AXLE TURNING METHOD FOR STEREO VISION AND APPARATUS THEREOF

CROSS-REFERENCE TO RELATED APPLICATIONS

This application claims priority under 35 U.S.C. §119 to Taiwan Patent Application No. 100106099, filed on Feb. 23, 2011 in the Taiwan Intellectual Property Office (TIPO), the contents of which are herein incorporated by reference in their entirety.

BACKGROUND OF THE INVENTION

1. Field of the Invention

The present invention relates to an imagery axle turning method for stereo vision and an apparatus thereof, and more particularly to a method and an apparatus of turning an imagery axle of lens unit to convert an aspect ratio of a 3D image.

2. Description of the Related Art

In a camera or a mobile phone with a photographic function, an image pickup module is provided for taking pictures of characters or landscape. However, images of a photographed object taken by a CCD (Charge Coupled Device) or a CMOS (Complementary Metal-Oxide Semiconductor) are 2D images merely, and a function of 3D images is necessary to consumer electronic products in the future. The present image capturing equipment such as cameras or camcorders, take images in 2D merely, but 2D images are deficient in the space impression. Consequently, at present, there are lots of methods capable of reconstructing the 2D images into the 3D image.

When a camera is used, general users expect to obtain 3D images of characters and landscape by the camera. Although the accuracy of using two lens units to reconstruct the stereo vision by a parallax method is relatively poor, yet the reconstruction can be achieved easily, and fits the general commercialized products, either. The stereo vision reconstruction method by the parallax method has been disclosed in patents, such as U.S. Pat. Nos. U.S. Pat. No.2004/0095643 disclosing a method or an apparatus adopting two image pickup modules to capture two images respectively for reconstructing into a 3D image; U.S. Pat. No.2004/0027657 using a refractive lens to form two optical paths for obtaining two images; U.S. Pat. No. 6,392,688 providing a way of using three image pickup modules to obtain three images respectively for reconstructing a 3D image through a more accurate calculation; and R.O.C. Pat. Publication No. TW201027230 disclosing a method or an apparatus of using two image pickup modules coordinated with a refractive lens with a plurality of refracting areas to obtain a plurality of images for reconstructing into a 3D image. These above patented technologies mainly using two (or three) images captured from two different positions to reconstruct into a 3D image after an image processing. In addition, R.O.C. Pat. Publication No. TW201015203 discloses a method or an apparatus of using a single image pickup module to obtain two images in different time sequences to reconstruct a 3D image after an image processing.

The prior arts about reconstructing stereo vision by a parallax method are restricted in an aspect ratio of the image sensor of the image pickup module (such as 4:3 or 16:9), such that an image with a horizontal width can be captured only, and the reconstructed 3D image is also limited to the usage of the horizontal axle for taking image. If users turn the camera from a shooting along horizontal axle to a shooting along vertical axle for taking images of a full-length portrait or a tall building, images cannot be with two different parallaxes, and a 3D image cannot be reconstructed. Therefore, it is still quite inconvenient to the users.

SUMMARY OF THE INVENTION

In view of the foregoing shortcomings of the prior arts, it is a primary objective of the present invention to provide an imagery axle turning method for stereo vision as shown in FIG. 2. The method is applied to a stereo vision apparatus comprising the first lens unit, the second lens unit and a stereo vision reconstruction processor, wherein the first lens unit comprises the first image pickup unit and the first image sensor, and the second lens unit comprises the second image pickup unit and the second image sensor, and the method comprises following steps:

S11: turning imagery axles I of the first lens unit and second lens unit of the stereo vision apparatus to an angle θ, wherein θ is an imagery axle angles of the first lens unit and the second lens unit between a horizontal axle X and an imagery axle I of the first image sensor, and has a symbol as shown in FIG. 3B;

S12: taking the first image of a photographed object by the first lens unit, and taking the second image of the photographed object by the second lens unit; and S13: transmitting the first image, the second image and data of the imagery axle angle θ to the stereo vision reconstruction processor, and constructing a 3D image by the stereo vision reconstruction processor.

As shown in FIG. 2, step S11 further comprises the following steps:

S111: forming the imagery axle angle θ by turning the first lens unit and the second lens unit to the angle θ; as shown in FIG. 3B, taking the first image and the second image through rotating the first lens unit and second lens unit to the imagery axle angle θ, such that a range of an aspect ratio of a horizontal image can be changed, such as from landscape to portrait.

Alternatively, step S11 further comprises the following steps:

S112: forming the imagery axle angle θ by turning the first image sensor and the second image sensor to the angle θ.

Another primary objective of the present invention is to provide an imagery axle turning apparatus for stereo vision. As shown in FIG. 3A, the apparatus comprises the first lens unit, the second lens unit, a rotation mechanism and a stereo vision reconstruction processor, and uses the imagery axle turning method for stereo vision as described in the above steps S11~S13 to construct a 3D image, wherein the first lens unit 21 comprises the first image pickup unit 211 and the first image sensor 212, and the second lens unit 22 comprises the second image pickup unit 221 and the second image sensor 222. The rotation mechanism 25 (as shown in FIG. 6) comprises the first rotation mechanism 2510 and the second rotation mechanism 2520. The first rotation mechanism 2510 can rotate the imagery axle I of the first lens unit to an angle θ (as shown in FIG. 3B), and the first image pickup unit 211 and the first image sensor 212 capture projected image of the photographed object to form the first image. The second rotation mechanism 2520 can rotate the imagery axle I of the second lens unit to the angle θ (as shown in FIG. 3B), and the second image pickup unit 221 and the second image sensor 222 capture projected image of the photographed object to form the second image. The stereo vision reconstruction processor 24 creates the 3D image from the first image, the second image and data of the imagery axle angle θ.

With the above-mentioned steps S11~S13 and S111, the present invention further provides an imagery axle turning apparatus for stereo vision, wherein the first rotation mechanism 2510 turns the first lens unit 21 to the angle θ by a rack, a sleeve cylinder or a stepping motor, and the second rotation mechanism 2520 turns the second lens unit 22 to the angle θ by a rack, a sleeve cylinder or a stepping motor as shown in FIG. 4 and FIG. 6. FIG. 6 is illustrated with the first rotation mechanism 2510 and the second rotation mechanism 2520 driven by the rotation mechanism 25. Although aforesaid embodiments are merely preferred embodiments of the invention, the invention is not to be limited to the aforesaid forms or arrangements of part as described and illustrated herein.

Moreover, with the mentioned steps S11~S13 and S112, the present invention provides an imagery axle turning apparatus for stereo vision 2. As described herein, FIG. 5 illustrates the turning of the first image sensor 212 and second image sensor 222 to the angle θ, wherein the first rotation mechanism 2510 (not shown in the figure) turns the first image sensor 212 to the angle θ, and the second rotation mechanism 2520 (not shown in the figure) turns the second image sensor 222 to the angle θ, and changing the range of the aspect ratio of the horizontal image based on the first image obtained by turning the first image sensor 212 to the imagery axle angle θ and the second image obtained by turning the second image sensor 222 to the imagery axle angle θ.

Another primary objective of the present invention is to provide an imagery axle turning method for stereo vision. As shown in FIG. 9, the method is applied to a stereo vision apparatus comprising the first lens unit, the second lens unit, the third lens unit and a stereo vision reconstruction processor, wherein the first lens unit comprises the first image pickup unit and the first image sensor, the second lens unit comprises the second image pickup unit and the second image sensor, and the third lens unit comprises the third image pickup module and the third image sensor. The method comprises the following steps:

S21: arranging the first lens unit, the second lens unit and the third lens unit into an isosceles right triangle, wherein the second lens unit is arranged at the position of the right angle, and the first lens unit and the third lens unit are arranged at positions of base angles respectively;

S22: turning an imagery axle of the stereo vision apparatus to an angle θ, wherein θ is an imagery axle angle of the stereo vision apparatus between a horizontal axle X and an imagery axle I of the first image sensor (or the second or the third image sensor), and has a symbol as shown in FIG. 3B;

S23: selecting a combination of the second lens unit with the first lens unit or the third lens unit to capture the first image and the second image of a photographed object.

In addition, the step S23 further comprises the following step:

S231: selecting two lens units on the imagery axle I to capture the first image and the second image of the photographed object.

Alternatively, the step S23 further comprises the following step:

S232: selecting two lens units on the horizontal axle X to capture the first image and the second image of the photographed object; and S24: transmitting data of the imagery axle angle θ of the stereo vision apparatus, the first image and the second image to the stereo vision reconstruction processor, and constructing a 3D image by the stereo vision reconstruction processor.

Another primary objective of the present invention is to provide an imagery axle turning apparatus for stereo vision 2.

As shown in FIG. 10, the apparatus comprises the first lens unit 21, the second lens unit 22, the third lens unit 23 and a stereo vision reconstruction processor 24 (not shown in the figure), and uses the steps S21~S24 and S231 or S232 to create a 3D image, wherein the first lens unit 21, the second lens unit 22 and the third lens unit 23 are arranged into an isosceles right triangle, and the second lens unit 22 is arranged at a position of the right angle, and the first lens unit 21 and the third lens unit 23 are arranged at positions of base angles respectively. When a user turns the stereo vision apparatus 2 to an angle θ, θ will be an imagery axle angle of the stereo vision apparatus. The stereo vision reconstruction processor 24 can create the 3D image from data of the angle θ after turning the stereo vision apparatus 2, the second image 223 formed by the second lens unit 22, and an image (first image 213) formed by another lens unit on the imagery axle I.

One more primary objective of the present invention is to provide an imagery axle turning method for stereo vision. As shown in FIG. 11, the method is applied to a stereo vision apparatus comprising the first image pickup unit, the second image pickup unit, a dual-path optical element, an image sensor, a time sequence generator and a stereo vision reconstruction processor, wherein the time sequence generator is provided for generating a time sequence signal to switch the optical channel of the dual-path optical element, and the dual-path optical element can select the first image pickup unit or the second image pickup unit in a time sequence to capture an image of a photographed object, and form an image on the image sensor. The method comprises following steps:

S31: turning an imagery axle of the image sensor of the stereo vision apparatus to an angle θ, wherein θ is an imagery axle angle of the image sensor between a horizontal axle X and an imagery axle I of the image sensor, and has a symbol as shown in FIG. 3B;

S32: guiding the projected image of the photographed object collimated from the first image pickup unit onto the image sensor to form the first image of the photographed object through the dual-path optical element in the first time sequence; guiding the projected image of the photographed object collimated from the second image pickup unit onto the image sensor to form the second image of the photographed object through the dual-path optical element in the second time sequence; and S33: transmitting data of the imagery axle angle θ of the image sensor, the first image and the second image to the stereo vision reconstruction processor, and constructing a 3D image by the stereo vision reconstruction processor.

Furthermore, one more primary objective of the present invention is to provide an imagery axle turning apparatus for stereo vision, as shown in FIG. 12 and FIG. 13, which comprise the first image pickup unit 211, the second image pickup unit 221, a dual-path optical element 26, an image sensor 212, a time sequence generator 265, a rotation mechanism 25 (not shown in the figure) and a stereo vision reconstruction processor 24. The apparatus uses the steps S31~S33 to construct a 3D image, wherein the rotation mechanism 25 is provided for turning an imagery axle of the image sensor 212 to an angle θ, and θ is an imagery axle angle of the image sensor 212. The dual-path optical element 26 can form an optical channel of the first image pickup unit 211, and transmit projected image of a photographed object 1 (not shown in the figure) through the first image pickup unit 211 and the dual-path optical element 26 to the image sensor 212 for forming the first image in the first time sequence sent out from the time sequence generator 265; the dual-path optical element 26 can form an optical channel of the second image pickup unit 221, and transmit projected image of the photographed object 1 (not shown in the figure) through the second image pickup unit 221 and the dual-path optical element 26 to the image sensor 212 for forming the second image in the second time sequence sent out from the time sequence generator 265. The stereo vision reconstruction processor 24 creates a 3D image based on data of the angle θ after rotating the stereo vision apparatus, the first image formed by the image sensor 212 in the first time sequence, and the second image formed by the image sensor 212 in the second time sequence.

As above mentioned, the imagery axle turning method for stereo vision and apparatus thereof in accordance with the present invention have one or more following advantages:

(1) In the imagery axle turning method of a stereo vision apparatus in accordance with the present invention, a landscape first image and a landscape second image can be converted into a portrait 3D image, such that users can selectively take landscape, portrait or variable aspect ratio 3D images easily.

(2) For different purposes, the present invention further provides different methods of turning the whole lens unit or the image sensor for more flexibility in applications, such that the present invention can provide an appropriate specific implementation of a dual-lens stereo vision apparatus based on the different methods for offering more options to the users.

(3) For convenience to users, the present invention provides an imagery axle turning method of a stereo vision apparatus through setting three images pickup modules to be accepted more easily by users. Thereby, the method of the present invention can be applied to portable mobile phones, cameras or handheld electronic devices, and take 3D images quickly by way of turning the electronic devices.

(4) The present invention adopts a dual-optical-path single image sensor, such that the stereo vision apparatus using the imagery axle turning method of the present invention can reduce the number of image sensors to lower the cost or enhance the depth of field caused by the increased back focal length of the image pickup lens units, so as to improve the 3D effect of the reconstructed 3D.

DETAILED DESCRIPTION OF THE PREFERRED EMBODIMENTS

The stereo information of a photographed object is very important for the location, orientation and visual perspective of the photographed object. However, images formed by an image pickup module and an image sensor (CCD or CMOS) are 2D images, which lost a coordinate value of one dimension. In general, the principle of stereo vision by binocular images using one or two cameras captures different images of the same photographed object from different view angles (or positions) through one or two images sensor (CCD or CMOS), and cooperates with an image processing technique to reconstruct a 3D image. The imagery axle turning method for stereo vision in accordance with the present invention applies the principle of stereo vision by binocular images, and turns the imagery axle of one or two images sensor to obtain two images with flexible or various imagery axles to reconstruct a 3D image.

Figure 1:
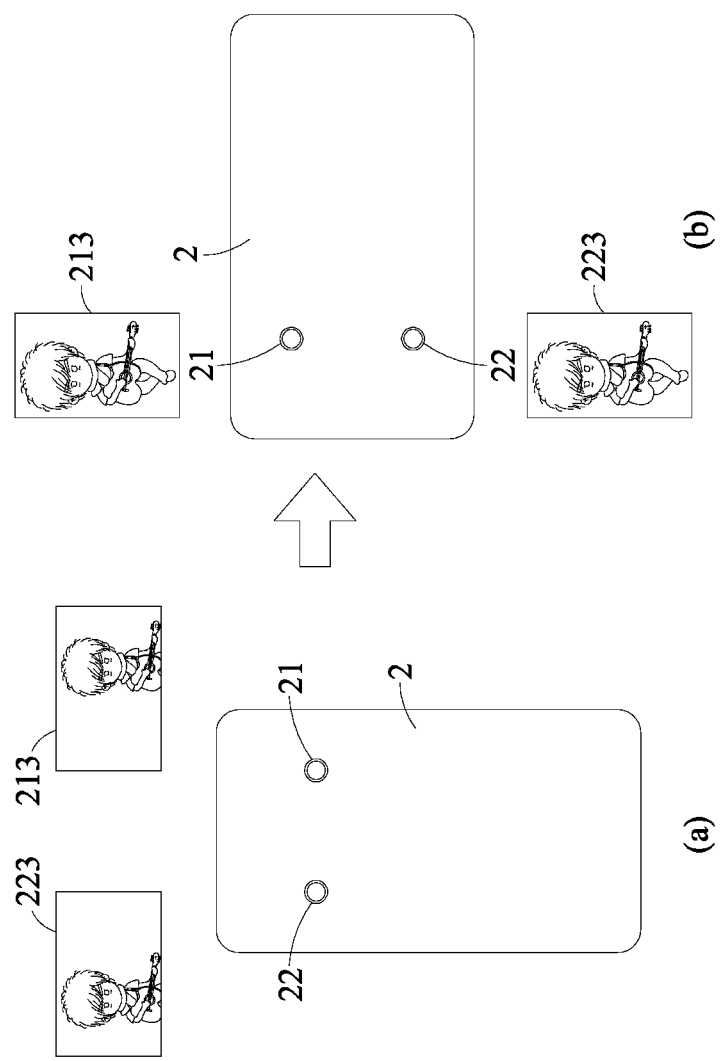
FIG. 1 is a schematic view of an imagery axle turning apparatus for stereo vision in accordance with the present invention.
Figure 3A:
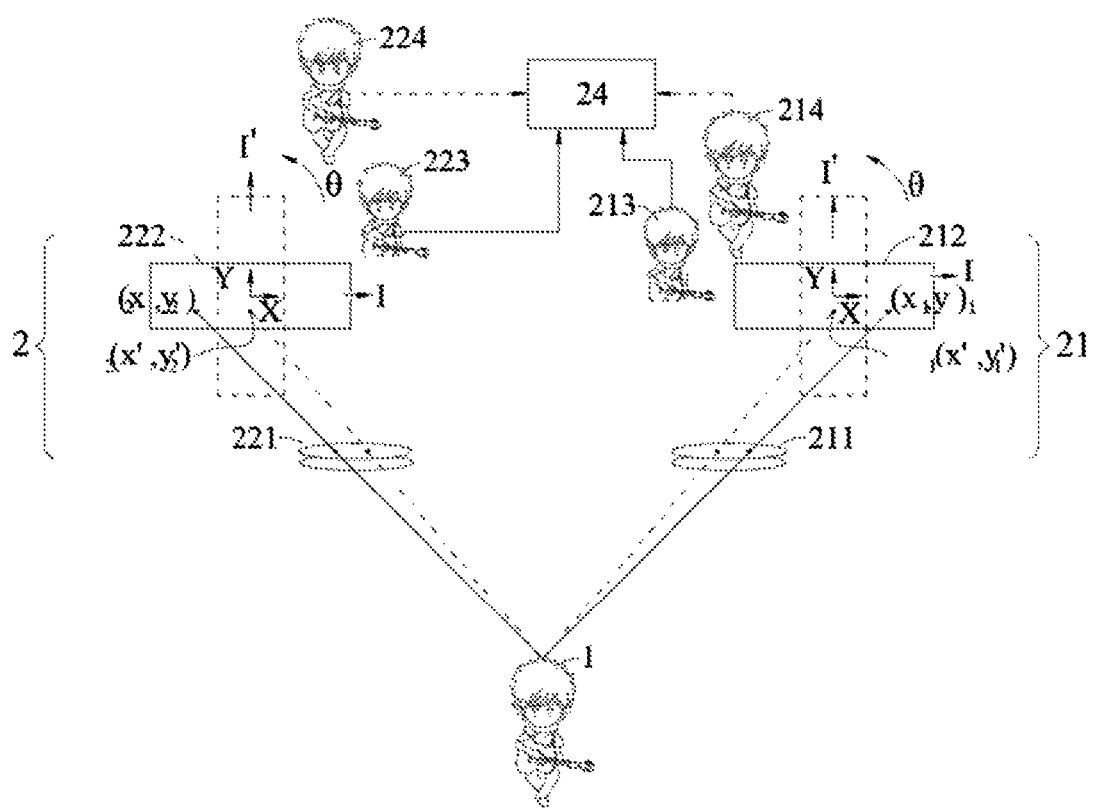
FIG. 3A is a schematic view of an imagery axle turning method for stereo vision cooperated with an apparatus thereof in accordance with the present invention.

Please refer to FIG. 1 and FIG. 3A, a stereo vision apparatus 2 comprises the first lens unit 21, the second lens unit 22 and a stereo vision reconstruction processor 24, wherein the first lens unit 21 comprises the first image pickup unit 211 and the first image sensor 212. Projected image of the photographed object 1 is focused by the first image pickup unit 211, and imaged on the first image sensor 212 to form the first image 213. A certain characteristic of the first image 213 is selected for comparison, which is usually selected as a human facial feature in camera applications, and the characteristic's coordinates are $(x_1, y_1)$. The first image sensor 212 has an aspect ratio of L/D, and for different commercial image sensors, the aspect ratio is generally equal to L/D=4/3 or L/D=16/9. Since the length along the x-axis of the aspect ratio of the first image sensor 212 is longer than the length along the y-axis of the aspect ratio, the first image 213 captured from the first image sensor 212 has a longer length along the x-axis than the y-axis (such as 4:3 or 16:9), thus used for taking a half-length image of the photographed object 1.

Similarly, the second lens unit 22 comprises the second image pickup unit 221 and the second image sensor 222, wherein projected image of the photographed object 1 is focused by the second image pickup unit 221, and imaged on the second image sensor 222 to form the second image 223. A certain characteristic (such as a facial feature) of the second image 223 is selected, and the characteristic's coordinates are $(x_2, y_2)$. The second image sensor 222 has an aspect ratio of L/D, and for different commercial image sensors, the aspect ratio is generally equal to L/D=4/3 or L/D=16/9. Since the length along the x-axis of the aspect ratio of the second image sensor 222 is longer than the length along the y-axis of the aspect ratio, the second image 223 captured from the second image sensor 222 has a longer length along the x-axis than the y-axis (such as 4:3 or 16:9), is also used for a half-length image of the photographed object 1.

The stereo vision reconstruction processor 24 can reconstruct a 3D image by the depth of the two images 213, 223 of the photographed object 1. In an actual scene, every flower, character, tree, mountain or the sky at a different distance has a different depth of field or maximum object height within a certain view angle, so that it is very important for users to be allowed to either capturing two images conveniently or overcoming the format limitation of the image aspect ratio.

With reference to FIG. 1(a) thereof shows users can capture the first image 213 and the second image 223 by the first lens unit 21 and the second lens unit 22 in a horizontal direction (a direction of the horizontal axle X) to construct the landscape 3D image. However, If users switch the dual-lens of camera to a vertical position (as shown in FIG. 1 (b)) when capturing a taller image (such as a full length of a human body or a tall building), the first lens unit 21 and the second lens unit 22 will align vertically with each another (the horizontal axle X convert into vertical), so that the principle of stereo vision by binocular images cannot be used for image processing to reconstruct the 3D image through different images of a photographed object 1 (first image 213 and second image 223) captured by the first lens unit 21 and the second lens unit 22 at different view angles (or positions).

Therefore, the present invention provides an imagery axle turning method for stereo vision to capture images by turning the imagery axle I of the first lens unit 21 and the second lens unit 22 as shown in FIG. 3A without changing the horizontal axle of the first lens unit 21 and the second lens unit 22. The image height of the photographed object 1 (such as the full length of a human body or a tall building) can be increased, and the principle of stereo vision by binocular images can be used for image processing to reconstruct a 3D image with increased height through different images of the same photographed object 1 (first image 213 and second image 223) captured by the first lens unit 21 and second lens unit 22 at different view angles (or positions).

In FIG. 3A, the horizontal axle of the first image sensor 212 is represented by X, and the imagery axle is represented by I. Before turning the first lens unit 21, the horizontal axle X and the imagery axle I of the first image sensor 212 are overlapping, and the horizontal line X and the imagery axle I of the second image sensor 222 are also overlapping on the same plane. The photographed object 1 forms the first image 213 and the second image 223 respectively on the first image sensor 212 and the second image sensor 222 through the first image pickup unit 211 and the second image pickup unit 221, and the coordinates of the featured points of the photographed object 1 on the first image 213 and the second image 223 are respectively $(x_1, y_1)$ and $(x_2, y_2)$. Therefore, the principle of stereo vision by binocular images can be applied for image processing to reconstruct the 3D image through different images of the same photographed object 1 (first image 213 and second image 223) captured by the first image 213 and second image 223 at different view angles (or positions) and the coordinates $(x_1, y_1)$ and $(x_2, y_2)$ of the featured points of the photographed object.

When the first lens unit 21 is turned, the horizontal axle X and the rotated imagery axle I' of the first image sensor 212 produce an imagery axle angle θ of the first lens unit 21. When the second lens unit 22 is turned, the horizontal axle X and the rotated imagery axle I' of the second image sensor 223 produce an imagery axle angle θ of the second lens unit 22. The photographed object 1 forms the third image 214 and the fourth image 224 respectively on the first image sensor 221 and the second image sensor 222 through the first image pickup unit 211 and the second image pickup unit 221, and the coordinates of the featured points of the photographed object 1 on the third image 214 and the fourth image 224 are $(x_{1'}, y_{1'})$ and $(x_{2'}, y_{2'})$. Thus, the principle of stereo vision by binocular images can be applied, and the stereo vision reconstruction processor 24 can reconstruct the 3D image from the coordinates $(x_1, y_1)$ and $(x_2, y_2)$ of the featured points on the third image 214 and the fourth image 224, data of the imagery axle angle θ, data of the third image 214 and fourth image 224.

Preferred embodiments are provided for illustrating the implementation of the present invention as follows.

<First Preferred Embodiment>

Figure 2:
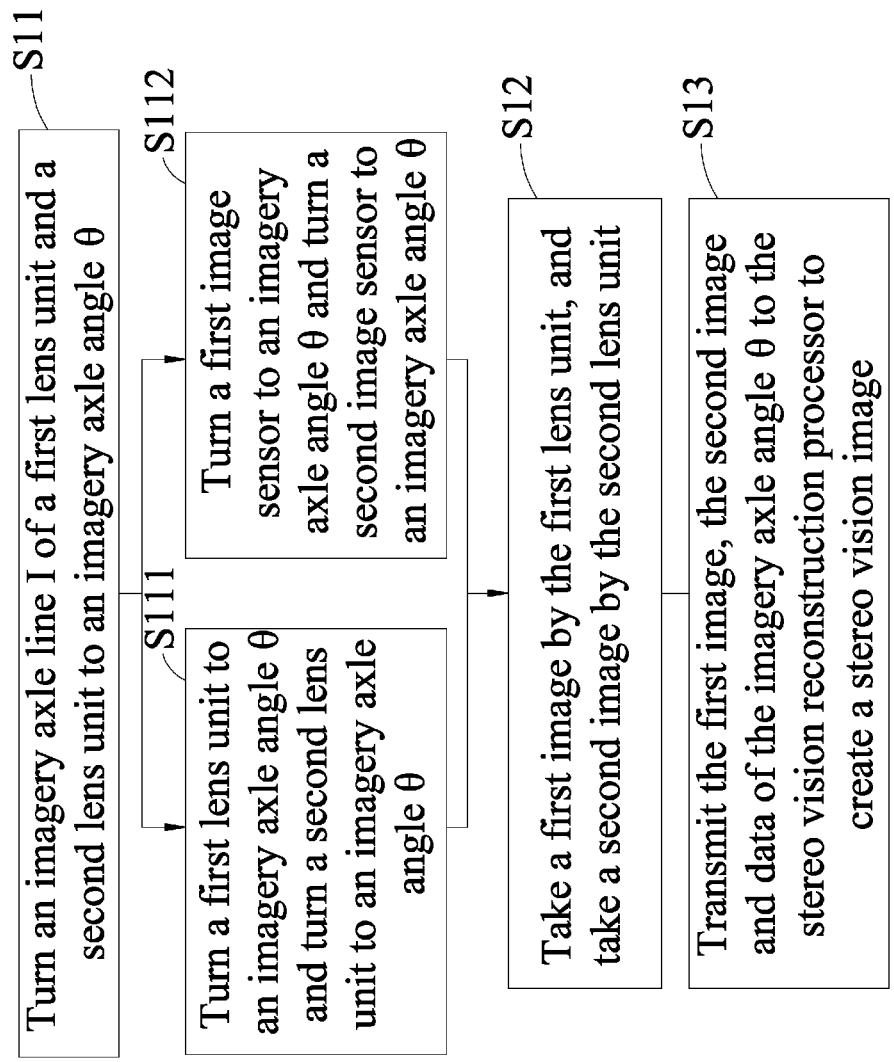
FIG. 2 is a flow chart of an imagery axle turning method for stereo vision in accordance with the first preferred embodiment and the second preferred embodiment of the present invention.

Please refer to FIG. 2 for an imagery axle turning method for stereo vision in accordance with the first preferred embodiment of the present invention, which is applied to a stereo vision apparatus comprising the first lens unit 21, the second lens unit 22 and a stereo vision reconstruction processor 24, wherein the first lens unit 21 comprises the first image pickup unit 211 and the first image sensor 212, and the second lens unit 22 comprises the second image pickup unit 221 and the second image sensor 222. The method comprises following steps:

S11: rotating an imagery axle I of the stereo vision apparatus to an angle θ between a horizontal axle X and the rotated imagery axle I' of the first image sensor 211, which represents an imagery axle angle θ;

S12: taking the first image 213 of a photographed object 1 by the first lens unit 21 and the second image 223 of the photographed object 1 by the second lens unit 22; and S13: transmitting the first image 213, the second image 223 and data of the imagery axle angle θ to the stereo vision reconstruction processor 24, and creating a 3D image by the stereo vision reconstruction processor 24.

Besides, the preferred embodiment provides an imagery axle turning apparatus for stereo vision 2. As shown in FIG. 1, the apparatus comprises the first lens unit 21, the second lens unit 22, a rotation mechanism 25 (shown in FIG. 6) and a stereo vision reconstruction processor 24, and uses the above-mentioned steps S11~S13 to create a 3D image.

As shown in FIG. 3A for the imagery axle turning apparatus for stereo vision 2 in accordance with this preferred embodiment, the first lens unit 21 comprises the first image pickup unit 211 and the first image sensor 212, and the rotation mechanism 25 (shown in FIG. 6) can rotate an imagery axle I to an angle θ to form the first image 213 through capturing projected image of a photographed object by the first image pickup unit 211 and the first image sensor 212. The second lens unit 22 comprises the second image pickup unit 221 and the second image sensor 222, and the second image pickup unit 221 and the second image sensor 222 capture projected image of the photographed object to form the second image 223. The stereo vision reconstruction processor 24 creates the 3D image from the imagery axle angle θ, the first image 213 and the second image 223.

Figure 4:
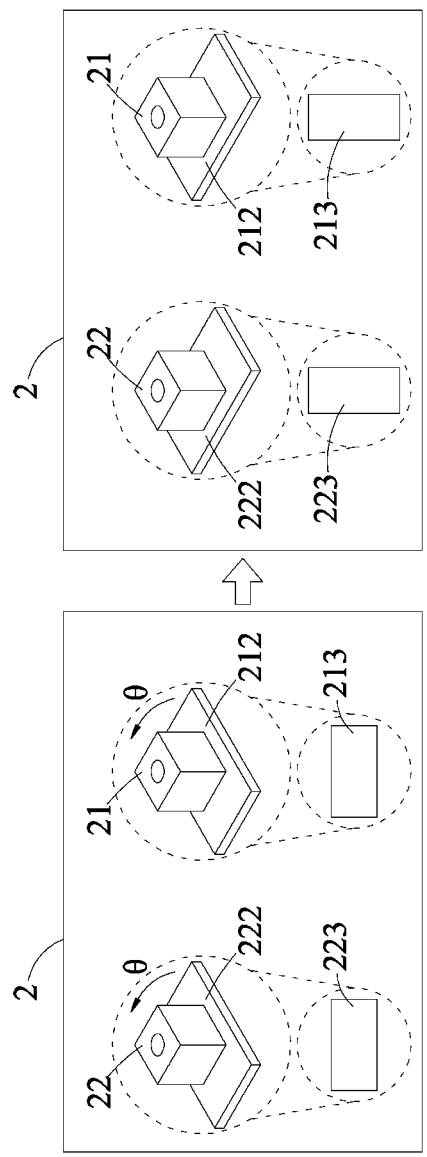
FIG. 4 is a schematic view of operating an imagery axle turning apparatus for stereo vision in accordance with the first preferred embodiment of the present invention.

The step S11 can further comprise the following step:

S111: rotating the first lens unit 21 and the second lens unit 22 until the imagery axle angle being θ degree. The imagery axle angle θ is formed by rotating the first lens unit 21 to an angle θ by the rotation mechanism 25. As shown in FIG. 4, an aspect ratio for horizontal image taking is converted from D/L=3/4 or D/L=9/16 to D/L=4/3 or D/L=16/9 (provided that) θ=±90° based on the first image 213 obtained from rotating the first lens unit 21 to the imagery axle angle θ. An aspect ratio for horizontal image taking is converted from D/L=3/4 or D/L=9/16 to D/L=4/3 or D/L=16/9 (provided that θ=±90°) based on the second image 223 obtained from rotating the second lens unit 22 to the imagery axle angle θ.

Figure 5:
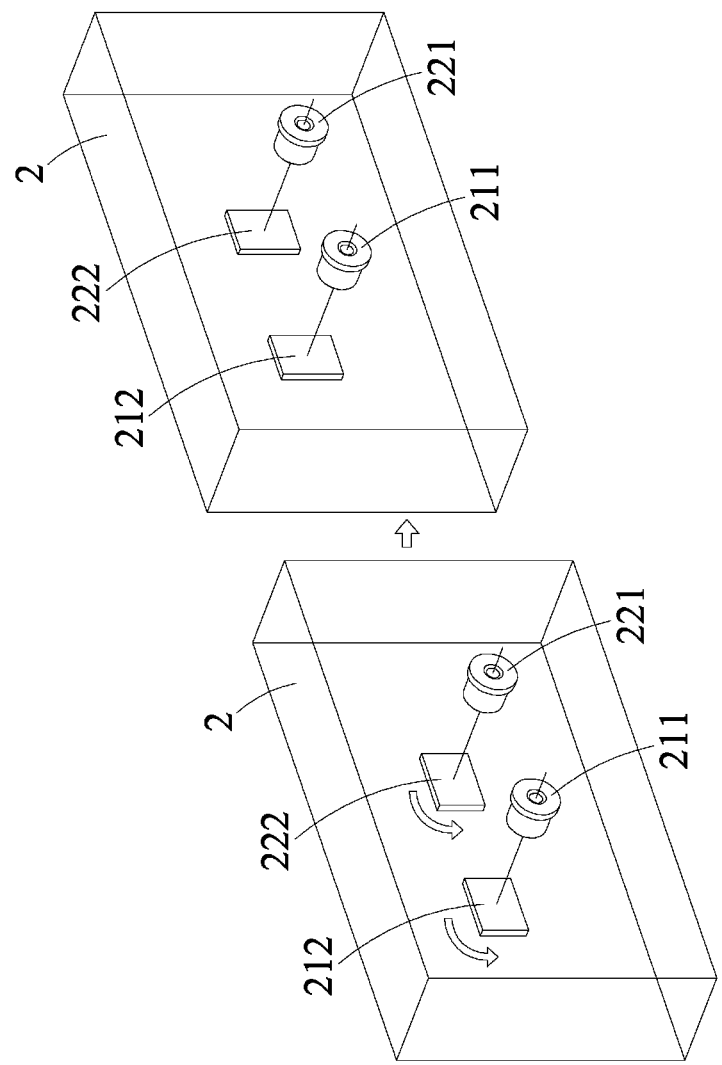
FIG. 5 is a schematic view of operating an imagery axle turning apparatus for stereo vision in accordance with the second preferred embodiment of the present invention.
Figure 6:
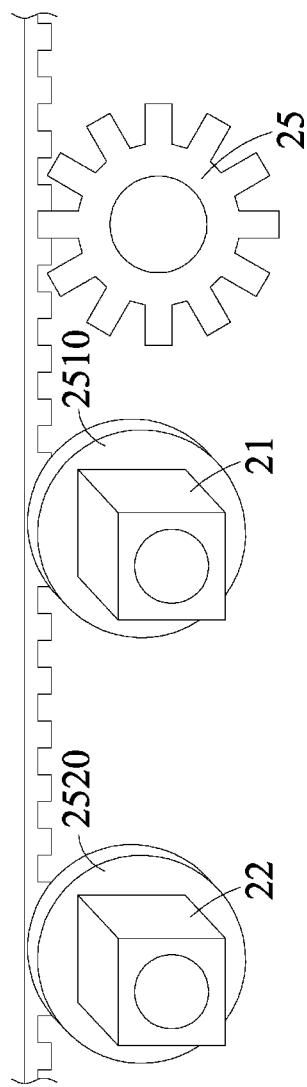
FIG. 6 is the first schematic view of a rotation mechanism of an imagery axle turning apparatus for stereo vision in accordance with first and second preferred embodiments of the present invention.

The method of the steps S11~S13 and S111 is applied to the imagery axle turning apparatus for stereo vision 2 of this preferred embodiment as shown in FIG. 4 through FIG. 6. The imagery axle turning apparatus for stereo vision 2 comprises the first lens unit 21, the second lens unit 22, a rotation mechanism 25 and a stereo vision reconstruction processor 24. The rotation mechanism 25 further comprises the first rotation mechanism 2510 and the second rotation mechanism 2520. The first rotation mechanism 2510 is provided for rotating the imagery axle of the first lens unit 21 to a user's desired angle (such as the imagery axle angle θ), and the second rotation mechanism 2520 is provided for rotating the imagery axle of the second lens unit 22 to the user's desired angle (such as the imagery axle angle θ). Preferably, the first lens unit 21 and the second lens unit 22 can be synchronously linked, such that they always have the same rotated angle. The first rotation mechanism 2510 and the second rotation mechanism 2520 can use the rotation mechanism 25 to drive a rack, and the rack drives the first rotation mechanism 2510 of the first lens unit 21 (or the second rotation mechanism 2520 of the second lens unit 22) to rotate. For different applications, the rotation mechanism 25 can use either a stepping motor or any other motion mechanisms, but not limited to the aforementioned forms or arrangements of parts as described and illustrated herein. Similarly, the execution of driving the rack is not limited to the aforementioned arrangement and can be accomplished by various mechanical designs as well.

Figure 7:
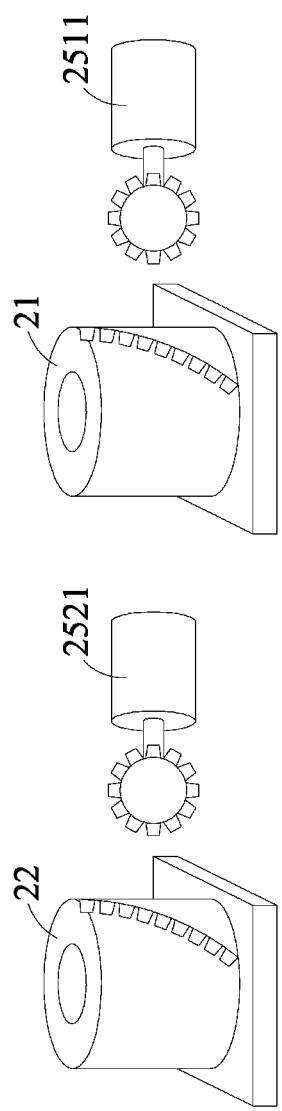
FIG. 7 is the second schematic view of a rotation mechanism of an imagery axle turning apparatus for stereo vision in accordance with first and second preferred embodiments of the present invention.

For a different application of the rotation mechanism 25 as shown in FIG. 7, the first lens unit 21 (or the second lens unit 22) can be driven to rotate directly by the first stepping motor 2511 (or the second stepping motor 2521). In FIG. 7, the first stepping motor 2511 is disposed gears on the motor spindle, and the gears of the first stepping motor 2511 drives the corresponding rack on the first lens unit 21 to rotate. The second stepping motor 2521 is disposed gears on the motor spindle, and the gears of the second stepping motor 2521 drives the corresponding rack on the second lens unit 22 to rotate. In different applications, the execution of using the stepping motor can be accomplished by various mechanical designs, but not limited to the aforementioned forms or arrangements of parts as described and illustrated herein.

Figure 8:
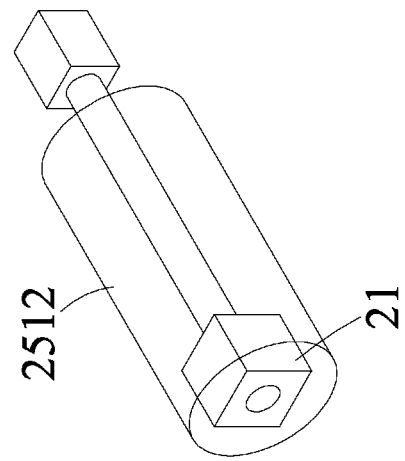
FIG. 8 is the third schematic view of a rotation mechanism of an imagery axle turning apparatus for stereo vision in accordance with first and second preferred embodiments of the present invention.
Figure 8:
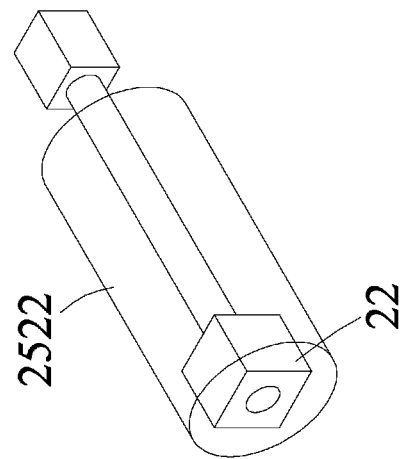

For rotating the first lens unit 21 (or the second lens unit 22) without any automatic mechanism, as shown in FIG. 8, the first lens unit 21 (or the second lens unit 22) is associated with the first sleeve cylinder 2512 (or the second sleeve cylinder 2522), and the first sleeve cylinder 2512 (or the second sleeve cylinder 2522) is rotated manually to drive the first lens unit 21 (or the second lens unit 22) to rotate. For different applications, various mechanical designs can be used for manually rotating the first sleeve cylinder 2512 (or the second sleeve cylinder 2522).

To facilitate the calculation made by the stereo vision reconstruction processor 24, the first rotation mechanism 2510 and the second rotation mechanism 2520 can be linked such that the first lens unit 21 and the second lens unit 22 have the same turning angle.

The aforementioned mechanism is provided as an example for the purpose of illustrating the present invention only, and any mechanism capable of achieving the equivalent effect of rotating the first lens unit 21 (or the second lens unit 22) is also covered within the scope of the present invention.

<Second Preferred Embodiment>

Please refer to FIG. 2 for an imagery axle turning method for stereo vision in accordance with the second preferred embodiment of the present invention, which is applied to a stereo vision apparatus comprising the first lens unit 21, the second lens unit 22 and a stereo vision reconstruction processor 24, wherein the first lens unit 21 comprises the first image pickup unit 211 and the first image sensor 212, and the second lens unit 22 comprises the second image pickup unit 221 and the second image sensor 222. The method comprises following steps:

S112: turning an imagery axle I of the stereo vision apparatus to an angle θ between a horizontal axle X and an imagery axle I of the first image sensor 211, which represents an imagery axle angle θ formed by turning the first image sensor 212 and the second image sensor 222 to an angle θ; as shown in FIG. 5, the first image sensor 212 is turned to an angle θ and the second image sensor 222 is turned to an angle θ, such that the first image sensor 212 can be turned to the imagery axle angle θ for obtaining the first image 213, and the second image sensor 222 can be turned to the imagery axle angle θ for obtaining the second image 223, such as D/L=4/3 or D/L=16/9 and D/L=4/3 or D/L=16/9;

S12: capturing the first image 213 of a photographed object 1 by the first lens unit 21 and the second image 223 of the photographed object 1 by the second lens unit 22; and S13: transmitting the first image 213, the second image 223 and data of the imagery axle angle θ to a stereo vision reconstruction processor 24, and creating a 3D image by the stereo vision reconstruction processor 24.

The method of the steps S11~S13 and S112 is applied to the imagery axle turning apparatus for stereo vision 2 of this preferred embodiment. The imagery axle turning apparatus for stereo vision 2 comprises the first lens unit 21, the second lens unit 22, a rotation mechanism 25 and a stereo vision reconstruction processor 24. The rotation mechanism 25 further comprises the first rotation mechanism 2510 and the second rotation mechanism 2520, wherein the first rotation mechanism 2510 can use a crack, a stepping motor, a manual sleeve cylinder or any other equivalent method to turn the first image sensor 212 to an angle θ, and the second rotation mechanism 2520 can use a crack, a stepping motor, a manual sleeve cylinder or any other equivalent method to turn the second image sensor 222 to an angle θ. The rotation mechanism 25 can be one similar those as shown in FIGS. 6~8. In addition, the first rotation mechanism 2510 and the second rotation mechanism 2520 can be linked, such that the first lens unit 21 and the second lens unit 22 can have the same turning angle.

<Third Preferred Embodiment>

Figure 3B:
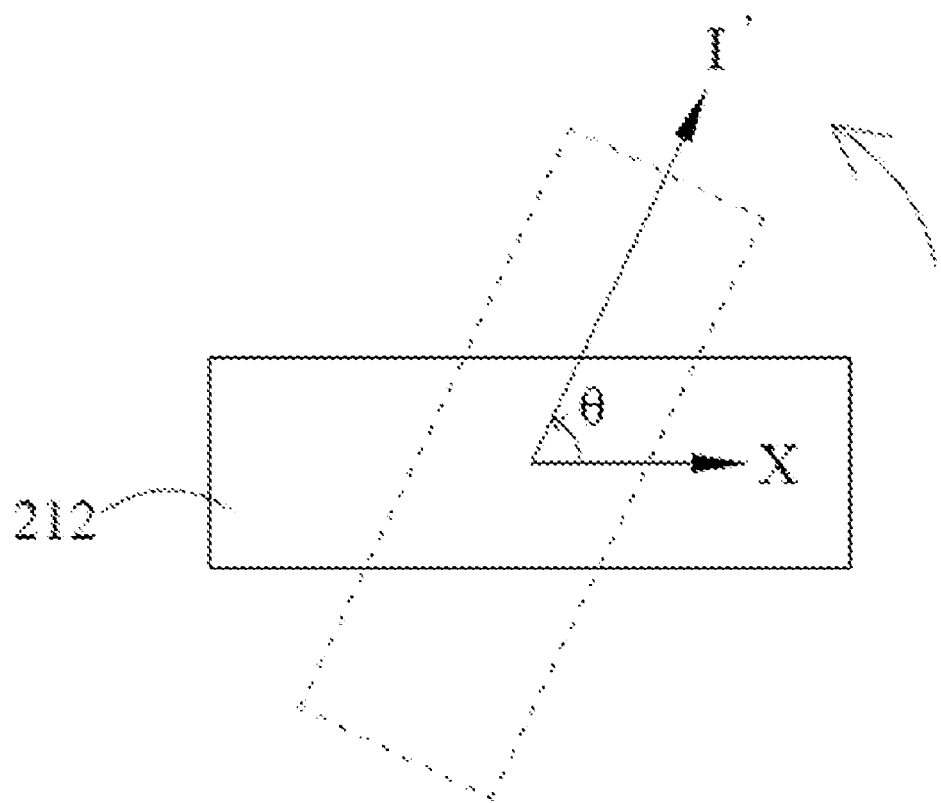
FIG. 3B is a schematic view of an imagery axle angle of an imagery axle turning method for stereo vision in accordance with the present invention.
Figure 9:
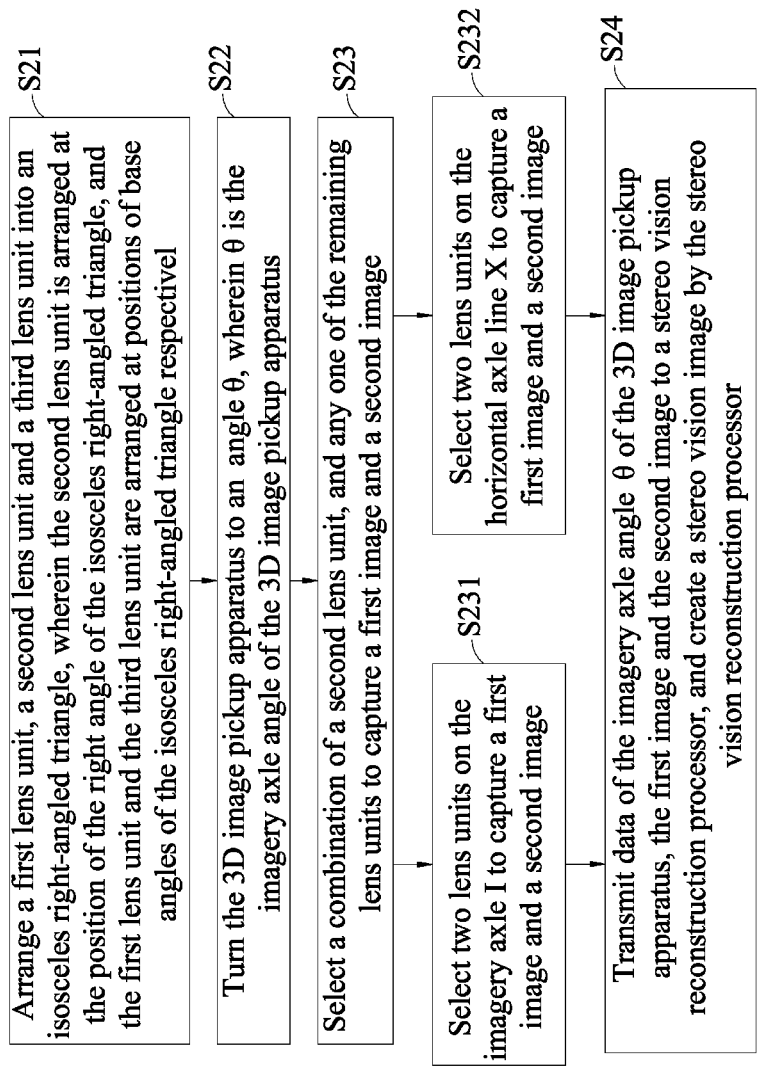
FIG. 9 is a flow chart of an imagery axle turning method for stereo vision in accordance with the third preferred embodiment of the present invention.
Figure 10:
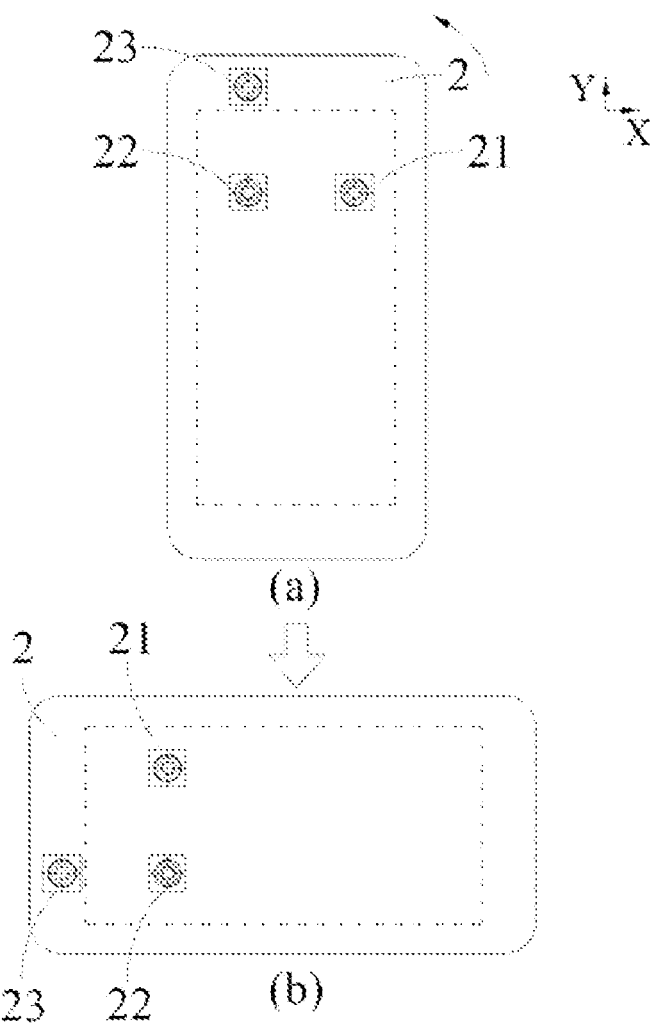
FIG. 10 is a schematic view of operating an imagery axle turning apparatus for stereo vision in accordance with the third preferred embodiment of the present invention.

Please refer to FIG. 9 for an imagery axle turning method for stereo vision in accordance with the third preferred embodiment of the present invention, which is applied to a stereo vision apparatus comprising the first lens unit 21, the second lens unit 22, the third lens unit 23 and a stereo vision reconstruction processor 24, wherein the first lens unit 21 comprises the first image pickup unit 211 and the first image sensor 212, the second lens unit 22 comprises the second image pickup unit 221 and the second image sensor 222, and the third lens unit 23 comprises the third image pickup module 231 and the third image sensor 232. The method comprises following steps:

S21: arranging the first lens unit 21, the second lens unit 22 and the third lens unit 23 into an isosceles right triangle, wherein the second lens unit 22 is arranged at a position of the right angle, and the first lens unit 21 and the third lens unit 23 are arranged at positions of base angles respectively as shown in FIG. 10; the first lens unit 21, the second lens unit 22 and the third lens unit 23 can adopt the same back focal length f to facilitate the calculation by the stereo vision reconstruction processor 24, and the first image sensor 212, the second image sensor 222 and the third image sensor 232 can be disposed with the same direction of aspect ratio to facilitate taking image;

S22: turning the stereo vision apparatus 2 to an angle θ, wherein θ is an imagery axle angle of the stereo vision apparatus 2 between a horizontal axle X and an imagery axle I of the first image sensor 212 (or the second image sensor 222, or the third image sensor 232), and has a symbol as shown in FIG. 3B;

S23: selecting the second lens unit 22, and one of the first lens unit 21 or the third lens unit 23 to capture the first image 213 and the second image 223 of a photographed object 1, wherein the selection method is shown in step S231 or S232;

S231: selecting two lens units on the imagery axle I to capture the first image 213 and the second image 223 of the photographed object;

S232: selecting two lens units on the horizontal axle X to capture the first image 213 and the second image 223 of the photographed object; and S24: transmitting data of the imagery axle angle θ of the stereo vision apparatus 2, the first image 213 and the second image 223 to the stereo vision reconstruction processor 24, and creating a 3D image by the stereo vision reconstruction processor 24.

Furthermore, this preferred embodiment provides an imagery axle turning apparatus for stereo vision 2 as shown in FIG. 10, which comprises the first lens unit 21, the second lens unit 22, the third lens unit 23 and a stereo vision reconstruction processor 24 (not shown in the figure), and uses the above-mentioned steps S21~S24 to construct a 3D image. In FIG. 10, the apparatus of this preferred embodiment is a 3D camera installed in a mobile phone and used as an example for illustrating the present invention, but not intended for limiting the scope of the present invention.

The first lens unit 21, the second lens unit 22, and the third lens unit 23 are installed at the backside of a dual-lens stereo vision apparatus 2 (such as a mobile phone), and the imagery axle I is in the horizontal direction. Now, the mobile phone is erected to facilitate users to hold the mobile phone by a hand. The aspect ratio of the first image sensor 212, the second image sensor 222, and the third image sensor 232 are equal to D/L=3/4, and the side L is aligned with the direction of the imagery axle I. Now, the captured first image 213 and second image 223 are landscape images, which are usually used for taking a half-length human image. In this preferred embodiment, the aspect ratio D/L=3/4 is used, but an image sensor with D/L=9/16 or any other equivalent image sensor can be used in this invention.

If a user uses a vertical mobile phone to capture a 3D image, as shown in FIG. 10(a), the first lens unit 21 and the second lens unit 22 will be set as work for taking images, but the third lens unit 23 will be set as nonworking for not taking images (or the captured images are not used to reconstruct 3D images). The horizontal axle X of the first image sensor 212 or the second image sensor 222 is coincident with the imagery axle I of the first image 213 or the second image 223. The 3D image formed by the stereo vision reconstruction processor 24 (not shown in the figure) is a landscape 3D image of the photographed object 1. At present, the method of step S232 is used, which is selecting two lens units on the horizontal axle X to capture the first image 213 and the second image 223 of the photographed object.

If the user wants to take a whole-length image of a photographed object (or take a panoramic image of a tall building), as shown in FIG. 10(b), the user can turn the dual-lens stereo vision apparatus 2 (or a mobile phone). Now, the imagery axle I is turned to an angle θ, and the method of step S231 is used, which is selecting two lens units on the imagery axle I to capture the first image 213 and the second image 223 of the photographed object. If the user uses a transverse mobile phone to take a 3D image as shown in FIG. 10(b), the third lens unit 23 and the second lens unit 22 will be set as work for taking images, and the first lens unit 21 will be set as non-working for not taking images (or the captured images are not used to reconstruct 3D images). The horizontal axle X of the third image sensor 232 or the second image sensor 222 is perpendicular to (having an angle θ with) the imagery axle I of the first image 213 or the second image 223. The 3D image formed by the stereo vision reconstruction processor 24 (not shown in the figure) is a portrait 3D image of the photographed object 1.

This preferred embodiment of the present invention further has the following advantage. Since the posture of the mobile phone can be obtained immediately from an inertial measurement unit (IMU) built in the mobile phone, when the user turns the mobile phone to change the imagery axle, the posture of the mobile phone will be converted into the imagery axle angle θ, and the stereo vision reconstruction processor 24 can reconstruct the 3D image from data of the imagery axle angle θ, the first image 213 and the second image 223. Thereby, users no longer need to hold the mobile phone at an accurate angle, but point and shoot a 3D image.

<Fourth Preferred Embodiment>

Figure 11:
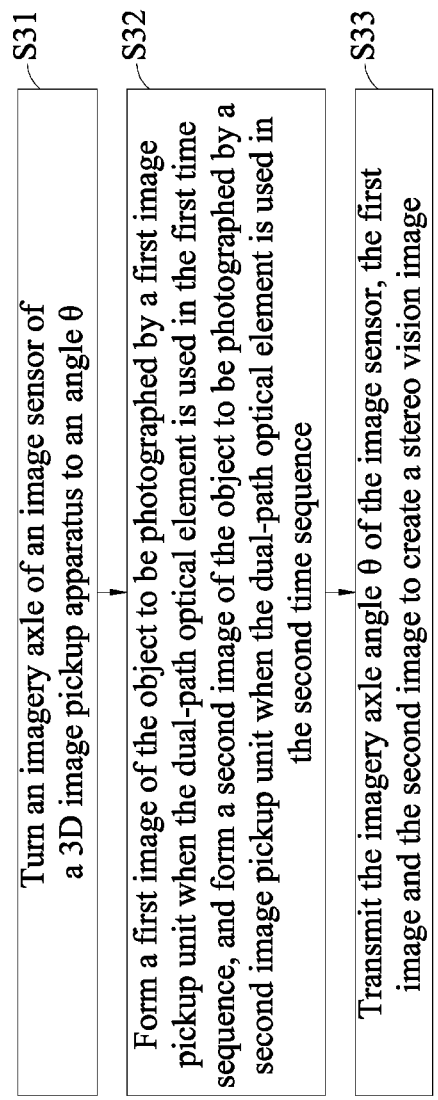
FIG. 11 is a flow chart of an imagery axle turning method for stereo vision in accordance with the fourth preferred embodiment of the present invention.

Please refer to FIG. 11 for an imagery axle turning method for stereo vision in accordance with the fourth preferred embodiment of the present invention, which is applied to a stereo vision apparatus 2 comprising the first image pickup unit 211, the second image pickup unit 221, a dual-path optical element 26, a time sequence generator 265, an image sensor 212 and a stereo vision reconstruction processor 24. The method comprises following steps:

S31: turning an imagery axle I of the image sensor 212 of the stereo vision apparatus 2 to an angle θ, wherein θ is an imagery axle angle of the image sensor 212 between a horizontal axle X and an imagery axle I of the image sensor 212, and has a symbol as shown in FIG. 3B;

S32: guiding the projected image of a photographed object 1 collimated from the first image pickup unit 211 into the image sensor 212 to form the first image 213 of the photographed object 1 through the dual-path optical element 26 in the first time sequence generated by the time sequence generator 265; guiding the projected image of the photographed object 1 collimated from the second image pickup unit 221 into the image sensor 212 to form the second image 223 of the photographed object 1 through the dual-path optical element 26 in the second time sequence generated by the time sequence generator 265; producing a series of interlacing image data of the first image 213 and the second image 223 when the first time sequence is interlaced with the second time sequence; and S33: transmitting data of the imagery axle angle θ of the image sensor 212, the first image 213 and the second image 214 to the stereo vision reconstruction processor 24 to create a 3D image.

Figure 12:
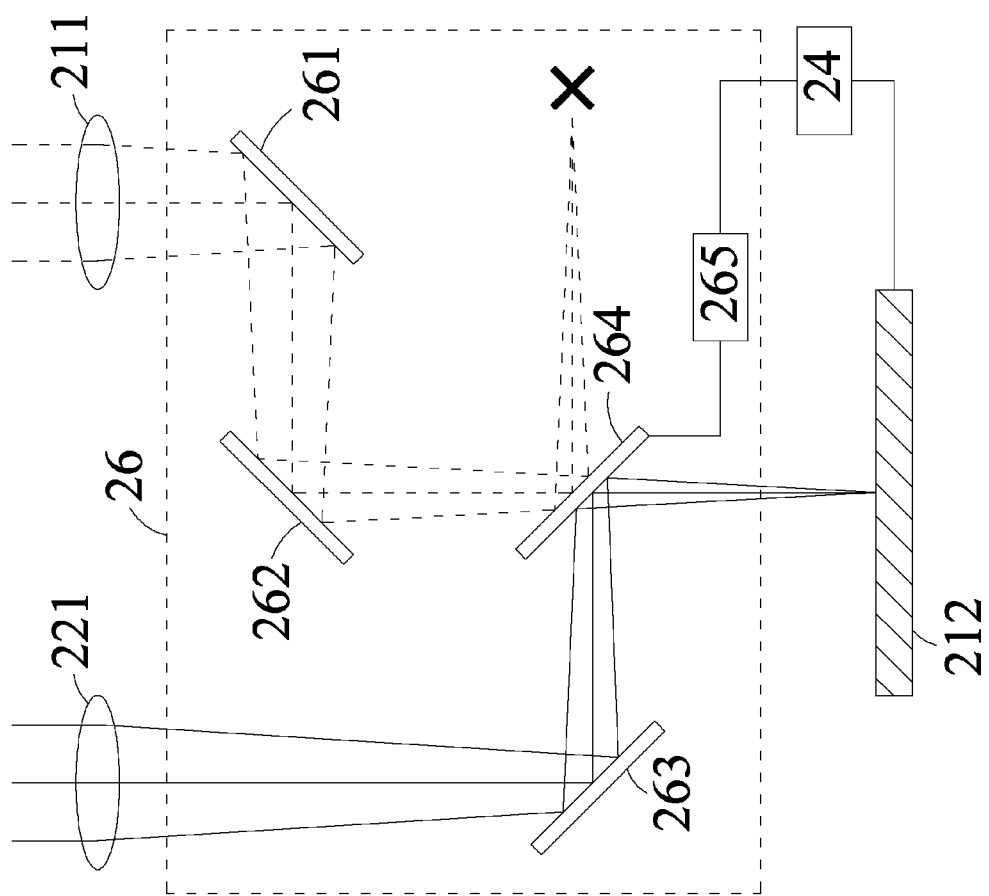
FIG. 12 is the first schematic view of operating an imagery axle turning apparatus for stereo vision in accordance with the fourth preferred embodiment of the present invention.
Figure 13:
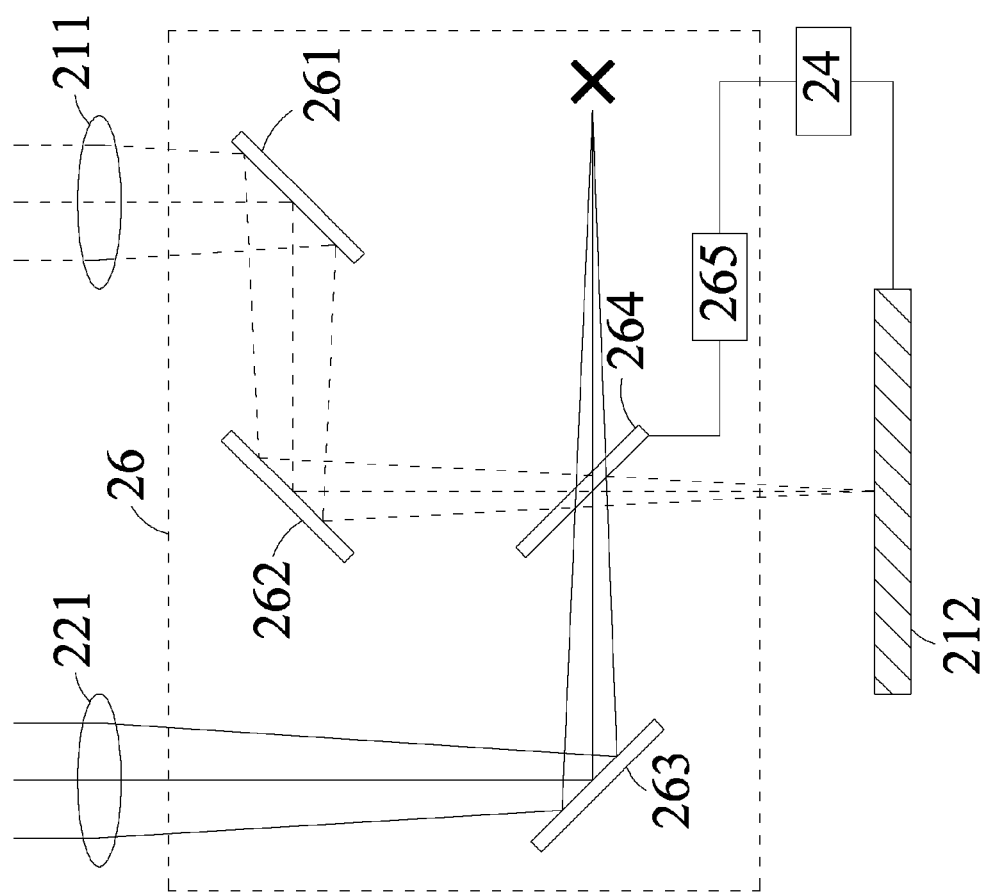
FIG. 13 is the second schematic view of operating an imagery axle turning apparatus for stereo vision in accordance with the fourth preferred embodiment of the present invention.

This preferred embodiment further provides an imagery axle turning apparatus for stereo vision 2 as shown in FIG. 12 and FIG. 13. The dual-path optical element 26 comprises the first reflector 261, the second reflector 262, the third reflector 263, an optical path switch 264 and the time sequence generator 265. The first reflector 261 and the second reflector 262 are installed at an image side of the first image pickup unit 211 and provided for refracting light collected by the first image pickup unit 211 and changing the direction of the light path. The third reflector 263 is installed at an image side of the second image pickup unit 221 and provided for refracting light collected by the second image pickup unit 221 and changing the direction of the light path. The optical path switch 264 can be a liquid crystal component composed of two electrode layers and filled with liquid crystal molecules between the two electrode layers. The aligning direction of the liquid crystal molecules can be controlled by different voltages applied to the two electrodes to control the incident light of the optical path switch 264 for selectively passing or fully reflecting. The optical path switch 264 can be an optical component including but not limited to a micro-electromechanical (MEMS) reflector, a rotary polygon mirror or a grating element. The time sequence generator 265 can issue a time sequence signal to the optical path switch 264 to control the optical path switch 264 ON or OFF. If the optical path switch 264 is ON in the first time sequence, then OFF in the second time sequence. The time sequence generator 265 can send out a pulse signal, such that the image sensor 212 transmits the captured projected image of the photographed object 1 to outward.

The optical path of the light passing from the first image pickup unit 211, the first reflector 261, the second reflector 262 and the optical path switch 264 to form an image at the image sensor 212 and the optical path of the light passing through the second image pickup unit 221, the third reflector 263 and the optical path switch 264 to form an image at the image sensor 212 are provided for facilitating the calculation of the stereo vision reconstruction processor 24 by adjusting the optical path of each reflector, such that the first image pickup unit 211 and the second image pickup unit 221 can have the same back focal length. Alternately, different back focal lengths of the first image pickup unit 211 and the second image pickup unit 221 can be used to adjust each reflector to have the same focusing optical path.

Figure 14:
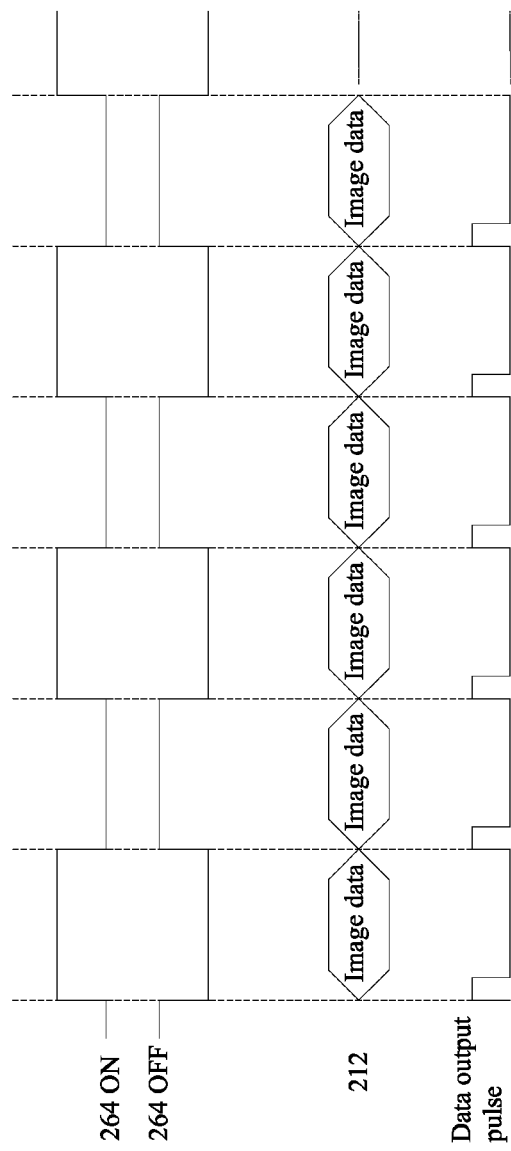
FIG. 14 is a schematic view of a time sequence of a control signal of an imagery axle turning apparatus for stereo vision in accordance with the fourth preferred embodiment of the present invention.

As shown in FIG. 12, the dual-path optical element 26 turns on the optical path switch 264 in the first time sequence generated by the time sequence generator 265, and projected image of the photographed object 1 collimated by the first image pickup unit 211 is passed from the first reflector 261 and the second reflector 262, and through the optical path switch 264 to guide into the image sensor 212 to form the first image 213 of the photographed object 1. As shown in FIG. 13, the dual-path optical element 26 turns off the optical path switch 264 in the second time sequence generated by the time sequence generator 265, and the projected image of the photographed object 1 collimated by the second image pickup unit 221 is passed from the third reflector 263, and reflected from the optical path switch 264 to guide into the image sensor 212 to form the second image 223 of the photographed object 1. Furthermore, when the first time sequence is interlaced with the second time sequence, a series of interlacing image data of the first image 213 and the second image 223 can be produced. In the timing diagram of the control signal as shown in FIG. 14, image data of the first image 213 can be formed at the image sensor 212 when the optical path switch 264 is enabled (or turned ON). When the optical path switch 264 is disabled (or turned OFF), image data of the second image 223 can be formed at the image sensor 212. The time sequence generator 265 generates data and outputs the pulse signal, such that when the image sensor 212 receives the pulse signal, the image data will be transmitted to the stereo vision reconstruction processor 24, and the stereo vision reconstruction processor 24 reconstructs the first image 213 and the second image 223 into the 3D image.

If a user wants to take a whole-length image of a photographed object 2 (or take a panoramic image of a tall building), the user can turn the imagery axle I of the image sensor 212 of the stereo vision apparatus 2 to an angle θ, and the dual-path optical element 26 can generate the first image 213 and the second image 223 with a smaller ratio D/L (a larger value of L) at the first time sequence and the second time sequence respectively. The imagery axle angle θ of the image sensor 212, the first image 213 and the second image 223 are transmitted to the stereo vision reconstruction processor 24, and the stereo vision reconstruction processor 24 creates a 3D image to form a portrait 3D image of the photographed object 1.

While the invention has been described by means of specific embodiments, numerous modifications and variations could be made thereto by those generally skilled in the art without departing from the scope and spirit of the invention set forth in the claims.

What is claimed is:

1. An imagery axle turning method for stereo vision, applied to a stereo vision apparatus, comprising a first lens unit, a second lens unit and a stereo vision reconstruction processor; the first lens unit comprising a first image pickup unit and a first image sensor; the second lens unit comprising a second image pickup unit and a second image sensor; the method comprising steps of:
   rotating the first image sensor and the second image sensor to an imagery axle angle θ while the first image pickup unit and the second image pickup unit being stationary;
   taking a first image of a photographed object by the first lens unit, and taking a second image of the photographed object by the second lens unit; and
   transmitting the first image, the second image and data of the imagery axle angle θ to the stereo vision reconstruction processor for constructing a 3D image;
   wherein the imagery axle angle θ is an angle between a horizontal axle and an imagery axle of the first image sensor, and the imagery axle angle θ is greater than zero.

2. An imagery axle turning apparatus for stereo vision, comprising a first lens unit, a second lens unit, a rotation mechanism and a stereo vision reconstruction processor; the first lens unit comprising a first image pickup unit and a first image sensor; the second lens unit comprising a second image pickup unit and a second image sensor; the rotation mechanism rotating the first image sensor and the second image sensor to an imagery axle angle θ while the first image pickup unit and the second image pickup unit being stationary; the first image sensor capturing a projected image of a photographed object to form a first image, and transmitting the first image to the stereo vision reconstruction processor; the second image sensor capturing a projected image of the photographed object to form a second image, and transmitting the second image to the stereo vision reconstruction processor; the stereo vision reconstruction processor constructing the 3D image from the first image, the second image and data of the imagery axle angle θ;

wherein the imagery axle angle θ is an angle between a horizontal axle and an imagery axle of the first image sensor, and the imagery axle angle θ is greater than zero.

3. The imagery axle turning apparatus for stereo vision as described in claim 2, wherein the rotation mechanism further comprises a first rotation mechanism and a second rotation mechanism, and the first rotation mechanism and the second rotation mechanism are driven synchronously by a rack, a stepping motor, a sleeve cylinder or a combination of the above.

* * * * *